US007338548B2

(12) United States Patent
Boutall

(10) Patent No.: US 7,338,548 B2
(45) Date of Patent: Mar. 4, 2008

(54) DESSICANT DEHUMIDIFER FOR DRYING MOIST ENVIRONMENTS

(76) Inventor: Charles A. Boutall, 318 Tarpon Dr., Bay St. Louis, MS (US) 39520

( * ) Notice: Subject to any disclaimer, the term of this patent is extended or adjusted under 35 U.S.C. 154(b) by 519 days.

(21) Appl. No.: 11/070,603

(22) Filed: Mar. 2, 2005

(65) Prior Publication Data
US 2005/0204914 A1 Sep. 22, 2005

Related U.S. Application Data

(60) Provisional application No. 60/550,093, filed on Mar. 4, 2004.

(51) Int. Cl.
B01D 53/06 (2006.01)
(52) U.S. Cl. .............................. 95/14; 95/113; 95/123; 95/126; 96/125; 96/144; 62/94; 62/271
(58) Field of Classification Search ................. 95/14, 95/113, 117, 121, 122, 123, 126; 96/125, 96/143, 144; 62/94, 271; 165/7
See application file for complete search history.

(56) References Cited

U.S. PATENT DOCUMENTS 4,952,283 A    8/1990  Besik ............................ 165/4
5,020,334 A    6/1991  Wilkinson ..................... 62/271
5,373,704 A   12/1994  McFadden ....................... 62/94
5,660,048 A *  8/1997  Belding et al. ................. 62/94
6,003,327 A   12/1999  Belding et al. ............... 62/271
6,575,228 B1   6/2003  Ragland et al. ............... 165/54

FOREIGN PATENT DOCUMENTS

JP        2002276998       9/2002

* cited by examiner

Primary Examiner—Robert A. Hopkins
(74) Attorney, Agent, or Firm—John H. Runnels; Bonnie J. Davis

(57) ABSTRACT

An apparatus and method of conditioning humidity and temperature in the process airstream of a desiccant dehumidifier used to dry moisture-laden spaces and structures by replacing moisture-laden air with dehumidified air to increase the rate of water evaporation within the affected areas. A heat-modulating dehumidifier comprises a dehumidification assembly having a desiccant rotor assembly, a post-process pre-reactivation heat exchanger assembly, a reactivation air bypass damper, a reactivation heater, and a control system. The apparatus regulates the temperature level of the dehumidified air exiting the apparatus by extracting heat from the dehumidified air prior to its ejection into an affected area, using a bypass damper that controls the amount of heat transfer from the dehumidified air to a second airstream entering the apparatus.

28 Claims, 3 Drawing Sheets

DESSICANT DEHUMIDIFER FOR DRYING MOIST ENVIRONMENTS

This invention pertains to an air dehumidifying device, more particularly a desiccant dehumidifier and method of conditioning air to remove water vapor from moisture-laden spaces and structures.

Buildings and homes continuously face potential water damage from unforeseeable events such as pipe failures, natural floods, roof leaks, and storms. Some structures may also sustain water damage from high moisture-laden air resulting from, for example, excessive humidity, improper ventilation, or malfunctioning heating, ventilating and air conditioning systems. To prevent permanent water damage to the structure and subsequent microbiological growth, it can be imperative that the structure be immediately dried.

Structural drying involves the transfer of moisture from one airstream (process air) to another airstream (reactivated air) by evaporating the moisture using dry air, and then either dehumidifying or replacing the resulting moisture-laden air with more dry air. The time required to dry a moisture-laden structure depends on the rate of evaporation, and the ability of localized air to absorb and remove moisture from the affected area.

Current methods for drying water-damaged structures often involve desiccant rotor systems having unregulated dehumidification systems. One of the most common desiccant configurations is the "four-holer," also referred to as a "75/25" split, which uses two separate airstreams, process and reactivation, with seventy-five percent of the desiccant rotor space dedicated to the process airstream for dehumidification, and twenty-five percent dedicated to the reactivation airstream for reactivating the desiccant rotor by heating the desiccant mass. This configuration typically provides a high level of grain depression (i.e., the measurement of water removed through dehumidification processes, measured in grains—one grain is equivalent to approximately $\frac{1}{7000}$ lb $H_2O$) (typically 50-60 grains when air moisture is high) because it uses most of the desiccant rotor for process airflow, but it also uses more energy and has higher heat carryover from the reactivation airstream to the process airstream than do other desiccant configurations.

Another common desiccant configuration, also unregulated, is the "three-holer," also referred to as the "purge," which uses less energy than the four-holer, but provides less grain depression (e.g., about 25-35 grains) and lower delivered air pressure since it uses only fifty percent of the desiccant rotor for process airflow. In this configuration, air entering the rotor is split into two separate airstreams. Fifty percent of the airstream flows through the desiccant rotor for dehumidification processing, twenty-five percent is used to recover "carryover heat," i.e., heat remaining in the rotor mass after the desiccant has been reactivated, and the remaining twenty-five percent is used for desiccant reactivation. These systems are usually run continuously until moisture is substantially removed, with little or no regulation of interior temperature or humidity conditions within the affected area.

There are several problems with using an unregulated dehumidification system to dry a moisture-laden area. For example, in inhabited structures, humans and pets are typically removed from the structure to minimize health risks associated with prolonged exposure to excessive heat, or the dangers associated with operating electronics sensitive to low relative humidity. To address such problems, some dehumidifying systems additionally comprise mechanical cooling devices such as chilled water coils or direct expansion cooling devices to regulate air temperature and humidity. Mechanical heating devices such as furnaces and electric heating strips are also used to regulate air temperature and humidity, often resulting in excessive energy consumption and maintenance costs.

U.S. Pat. No. 6,575,228 describes a device and method for ventilating fresh air into a conditioned space, comprising a desiccant wheel that dehumidifies incoming air by exchanging moisture from the incoming air with out-flowing air. In one embodiment, a regenerative heater is used to regenerate and defrost the desiccant wheel so that the out-flowing air can be heated and dehumidified before it passes through the desiccant wheel.

Japanese Pat. Abstract No. 2002276998 describes a device for supplying low temperature and low humidity air to a conditioned space, comprising a desiccant dehumidifier having a dehumidifying rotor, and a heat exchanger having a primary and secondary side. In one embodiment, moisture is absorbed from air passing through the primary side using a dehumidifying agent, and then is released from the agent by exposing it to heated air at the secondary side.

U.S. Pat. No. 6,003,327 describes a device and method for dehumidifying and cooling air in an air-conditioning system, comprising an absorption wheel, a heat exchanger and an evaporative cooler. In one embodiment, the device heats incoming air as it passes through the absorption wheel to remove humidity, and then cools the heated, incoming air by passing it through a heat exchanger followed by an evaporative cooler. In another embodiment, a portion of the incoming air flows directly to the evaporative cooler, bypassing the absorption wheel and heat exchanger.

U.S. Pat. No. 5,373,704 describes a device and method for recirculating and dehumidifying air within a living space, comprising an evaporator coil, a desiccant wheel, and a heat exchanger enclosed by partitions that form a first air treatment passageway and a second or regenerative air passageway. In one embodiment, air from within the living space is first drawn into a conduit and partitioned so that a portion of the air passes through the first air treatment passageway and the desiccant wheel to reduce its moisture content, while simultaneously passing outside air through the regenerative air passageway to remove moisture absorbed from the first air treatment passageway. The drier air is then remixed with the air within the conduit and cooled by passing it through the evaporator coil before returning it to the living space.

U.S. Pat. No. 5,020,334 describes a device for dehumidifying and cooling air within an enclosed space, comprising a refrigeration subsystem and a liquid desiccant dehumidification subsystem. In one embodiment, the device passes outside ventilation air through the dehumidification subsystem to remove moisture from the air, and then combines the drier air with air recirculated from the enclosed space. The air then passes through the refrigeration subsystem before it returns to the enclosed space.

U.S. Pat. No. 4,952,283 describes a device for ventilating, dehumidifying and cooling air or industrial gases, and recovering heat, comprising a desiccant located in a stationary matrix having one or more beds of solid materials with moisture and heat sorption properties. In one embodiment, two gaseous streams flow counter-current through the desiccant and a heat exchanger to remove moisture and heat from the air.

I have discovered a device and method for effectively drying moisture-laden spaces and structures (e.g., buildings, homes, maritime vessels, manufacturing facilities, and storage facilities) by dehumidifying ambient or recirculated air, and then using the dehumidified air to absorb water vapor and replace moisture-laden air with the dehumidified air. The basic design comprises a dehumidification assembly having a desiccant rotor and a control system. In one embodiment, a "heat-modulating dehumidifier" provides a self-contained system that dehumidifies affected areas, while monitoring and controlling the temperature and humidity levels within the affected areas. Moisture-laden air is replaced with drier air to increase the rate of water evaporation within the affected areas. This device may be adapted to dry large or small moisture-laden spaces and structures.

Unlike prior unregulated dehumidification systems that rely on mechanical cooling devices such as chilled water coils or direct expansion cooling devices to regulate air temperature and humidity, the novel device preferably regulates the temperature level of dehumidified air (post-process air) exiting the heat-modulating dehumidifier by extracting heat from the air prior to its ejection into an affected area, using a bypass damper that helps control the amount of heat transfer from the dehumidified air to a second airstream entering the apparatus (pre-reactivation air).

Figure 1A:
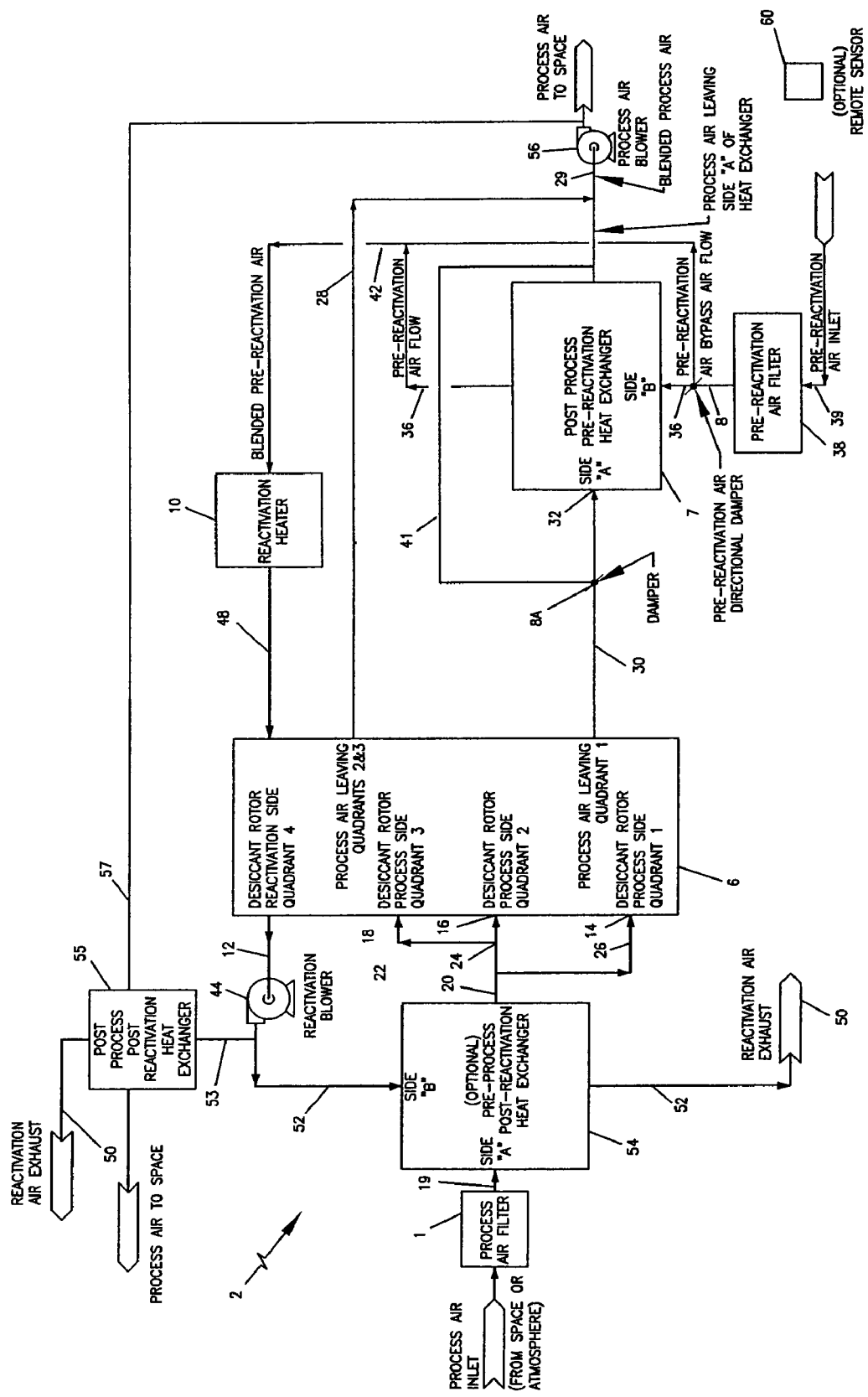
FIG. 1A illustrates schematically a block diagram of the major components of one embodiment of the heat-modulating dehumidifier and the process of dehumidifying moisture-laden air.

This invention provides a reliable, inexpensive device and method for effectively treating moisture-laden spaces and structures (e.g., buildings, homes, maritime vessels, manufacturing facilities, and storage facilities) by conditioning the humidity and temperature of pre-process air (i.e., untreated air drawn from either inside or outside the moisture-laden area) to increase the rate of water evaporation within the affected area. In one embodiment, a heat-modulating dehumidifier comprises a dehumidification assembly having a desiccant rotor with a plurality of passages through which air can flow. In this embodiment, the desiccant rotor conditions pre-process air entering the device by heating and dehumidifying the air. Heat initially generated by the dehumidifier may then be extracted from the post-process air (i.e., dehumidified air exiting the heat-modulating dehumidifier) using a post-process pre-reactivation heat exchanger before it is ejected into the affected area.

In a preferred embodiment, the heat-modulating dehumidifier further comprises a reactivation heater that heats pre-reactivation air (i.e., ambient outside air or air having a lower temperature and a higher humidity than post-process air that has been ejected into the affected area) before it is circulated through the desiccant rotor, and a bypass damper that variably diverts either pre-reactivation or post-process air around the post-process pre-reactivation heat exchanger to control the amount of heat extracted from the post-process air before it exits the heat-modulating dehumidifier. In this embodiment, humidity and temperature levels within the affected area are controlled by adjusting the temperature levels of the post-process air using an automatic or manual control system to regulate the amount of air diverted by the bypass damper and the temperature levels of the reactivation heater. Optionally, the post-process air temperature can be increased by preheating the pre-process air before it enters the desiccant rotor using a pre-process post-reactivation heat exchanger that extracts heat from the post-reactivation air (i.e., ambient air which has been heated to allow for the regeneration/reactivation of the desiccant rotor) before it is exhausted. Alternatively, a post-process post-reactivation heat exchanger can be used to transfer heat from post-reactivated air to the post-process airstream before it enters the affected area.

There are several advantages to drying moisture-laden spaces and structures using this device. First, its fabrication can be simple and inexpensive. The number of components may be small. Second, energy consumption and maintenance costs can be reduced. The control system enhances temperature control without requiring mechanical heating or cooling systems. Third, the time needed to dry moisture-laden spaces and structures may be reduced. The control system can improve drying time and energy efficiency by monitoring the temperature and humidity of the air within the affected area, and continuously adjusting the humidity and temperature levels of the exiting post-process air by diverting a portion of the post-process or pre-reactivation airstream around the post-process pre-reactivation heat exchanger to adjust the heat transfer rate from the post-process airstream to the pre-reactivation airstream, without the need for mechanical cooling or heating. Fourth, health risks associated with prolonged exposure to excessive heat and microbiological growth, and the operation of humidity-sensitive electronics (e.g., home appliances, computers, televisions, light fixtures, etc.) can be reduced. When using an automatic control system, the device may be programmed to condition the post-process air for humidity and temperature levels suitable for humans, pets, plants, computers, books, microfiche and other sensitive items. Fifth, the device may be portable and easily installed and removed, leaving little or no evidence of its previous operation. Finally, the device can be adapted for use in colder climates (e.g., temperatures ranging from about −10° F. to about 40° F.) by increasing the temperature levels of the post-process airstream using either a pre-process post-reactivation or post-process post-reactivation heat exchanger.

Figure 1B:
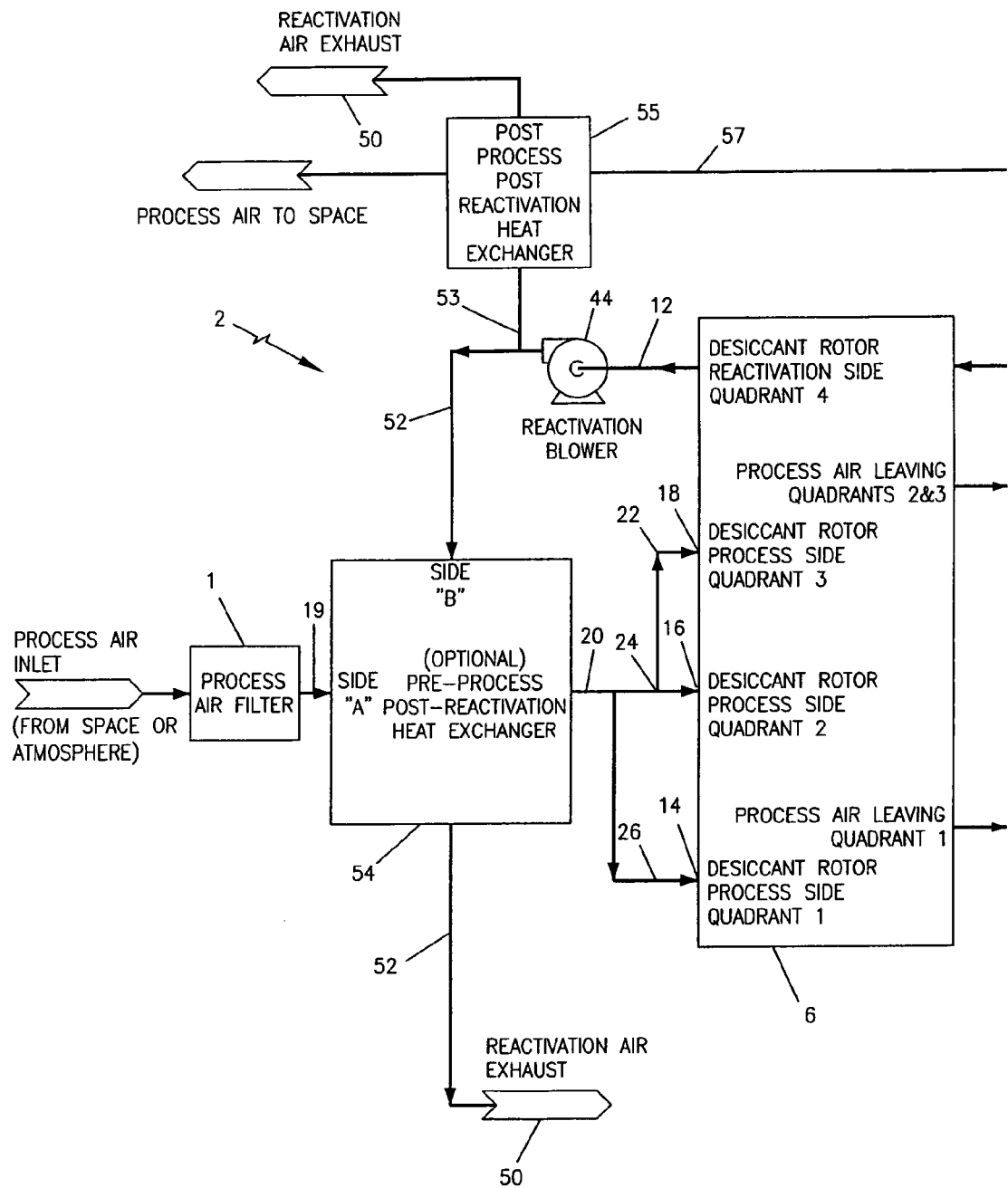
FIG. 1B illustrates a partial view of the left side of the block diagram of the major components of one embodiment of the heat-modulating dehumidifier and the process of dehumidifying moisture-laden air.
Figure 1C:
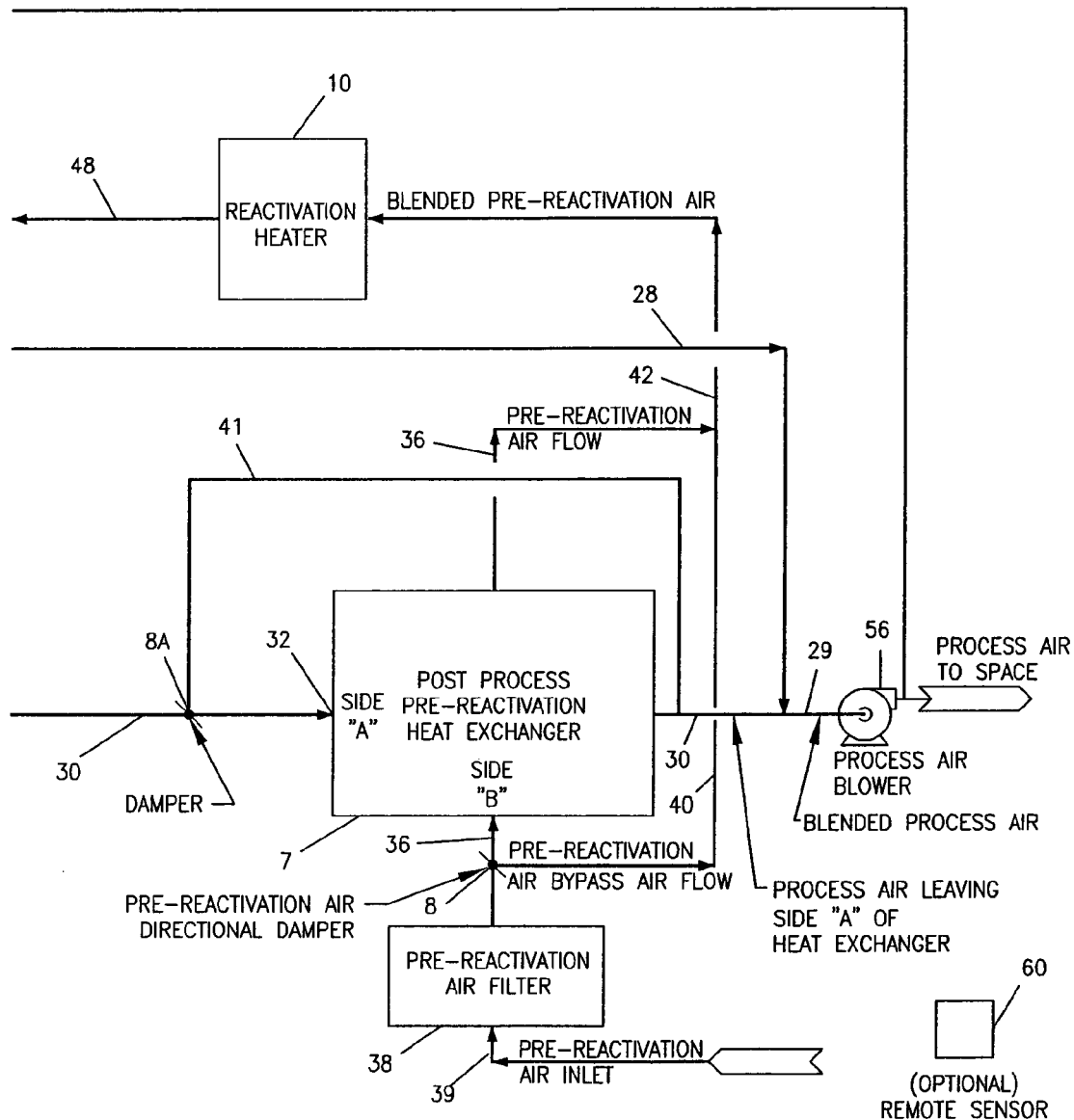
FIG. 1C illustrates a partial view of the right side of the block diagram of the major components of one embodiment of the heat-modulating dehumidifier and the process of dehumidifying moisture-laden air.

FIGS. 1A-1C illustrate schematically a block diagram of the major components of one embodiment of the heat-modulating dehumidifier and the process of dehumidifying air. This embodiment comprises a dehumidification assembly 2 and a control system (not shown). The dehumidification assembly 2 comprises a desiccant rotor assembly 6, a post-process pre-reactivation heat exchanger assembly 7, a reactivation air bypass damper 8, and a reactivation heater 10. Desiccant rotor assembly 6 comprises a desiccant rotor (not shown) and a drive motor (not shown). The desiccant rotor, as shown in FIGS. 1A and 1B, functions as the main source for providing conditioned air to an affected area by removing water from pre-process air (i.e., untreated air drawn from either inside or outside the moisture-laden area) before the air is ejected into the affected area. The drive motor in one embodiment is an alternating current induction motor sized to fit within a given operating space. In an alternative embodiment, the drive motor can be a direct current motor, a hydraulic motor, or an internal combustion engine. The drive motor has a drive ratio (ratio of motor speed to desiccant rotor speed) and a power output sufficient to allow the drive motor to controllably spin the desiccant rotor at a predetermined speed.

Factors considered in designing embodiments of the desiccant rotor assembly 6 include power rating, physical size, inside or outside usage, airflow characteristics (i.e., positive, negative, or neutral air-flow), reactivation heater requirements, rotor composition, dehumidification rate, and air intake capacity. Desiccant rotor assembly 6 in a prototype embodiment comprised a four hole-type silica gel desiccant rotor adapted to fit within a given operating space for inside usage and to dehumidify pre-process air, using all of the available process rotor space. This desiccant rotor had one reactivation section 12 and three process sections, 14, 16, and 18. See FIGS. 1A and 1B.

In the embodiment illustrated in FIGS. 1A-1C, ambient air or air returned from the affected area (pre-process air) first passed through air-filtered inlet 1 to remove materials such as dust particles and insects before passing through lines 19 and 20. The pre-process air flowing through line 20 was divided among lines 22, 24, and 26 before entering process sections 18, 16, and 14, respectively. The flow of air and the rotation of the desiccant rotor complemented each other such that the pre-process air was heated and dehumidified to a predetermined level before it exited the desiccant rotor along lines 28 and 30. The dehumidified air (post-process air) exiting process section 14 along line 30 entered side 32 of post-process pre-reactivation heat exchanger 7, as shown in FIGS. 1A and 1C, and rejoined the post-process air exiting process sections 16 and 18 (which exited along line 28) along line 29.

In the embodiment illustrated in FIGS. 1A and 1C, post-process pre-reactivation heat exchanger 7 comprised a set of cross-flowing channels (not shown) along lines 30 and 36. The size and shape of post-process pre-reactivation heat exchanger 7 were adapted to fit within a given space and to allow for a sufficient amount of heat transfer from the post-process air drawn from process section 14 to the pre-reactivation air (i.e., ambient air having a lower temperature and a higher humidity than post-process air that has been ejected into the affected area, and which may be extracted for reprocessing) flowing along line 36, using a process air blower 56. The post-process air flowing along line 29 was ejected from air blower 56 into the affected area. In a preferred embodiment, the amount of heat extracted from the post-process air by the post-process pre-reactivation heat exchanger 7 was regulated by variably diverting pre-reactivation airstreams entering through filtered inlet 38 along line 39 either through post-process pre-reactivation heat exchanger 7, around post-process pre-reaction heat exchanger 7 as shown by line 40, or both, using bypass damper 8. (When operating the system from an area external to the affected area, ducts may be used to route post-process air from air blower 56 to the affected area, and to return pre-process air to filtered inlet 1. See FIGS. 1A and 1B.) Bypass damper 8 was sized and shaped to fit within a given space and to divert a sufficient amount of pre-reactivation air through post-process pre-reactivation heat exchanger 7 to allow for the effective control of post-process air temperature to levels suitable for humans, pets, plants, computers, books, microfiche and other items sensitive to high humidity and temperature levels, while maintaining high drying efficiency. The pre-reactivation airstreams in lines 36 and 40, as shown in FIGS. 1A and 1C, were rejoined before being drawn into reactivation heater 10 and reactivation section 12 by a reactivation air blower 44. In an alternative embodiment, the level of heat extraction from the post-process air by the post-process pre-reactivation heat exchanger 7 is regulated by variably diverting a portion of post-process air exiting process section 14 around post-process pre-reactivation heat exchanger 7 along line 41 using bypass damper 8A.

In the embodiment illustrated in FIGS. 1A and 1C, reactivation heater 10 was used to heat the pre-reactivation air in line 42 before it entered the reactivation section 12. As the desiccant rotor rotated, heat accumulating in the desiccant rotor mass in reactivation section 12 was transferred to process section 14 heating the post-process air. Reactivation heater 10 was sized and shaped to fit within a given space and to add sufficient heat to the pre-reactivation air in line 48 such that moisture in the desiccant rotor mass was evaporated as the post-reactivation air exited reactivation exhaust outlet 50 along line 52. See FIG. 1B. Optionally, a pre-process post-reactivation heat exchanger 54, as shown in FIGS. 1A and 1B, can be used to transfer heat from the post-reactivation air in line 52 to the pre-process airstream flowing in line 19 before the latter enters process sections 14, 16, and 18. Alternatively, heat from the post-reactivation air flowing along line 53 can be transferred to the post-process air in line 57 using post-process post-reactivation heat exchanger 55 before it is ejected into the affected area.

In the embodiment illustrated in FIGS. 1A and 1C, the control system (not shown) comprises a temperature sensor (thermometer) and a damper actuator (an actuating handle). In this embodiment, the thermometer measures the temperature of post-process air in the moisture laden area and an operator controls the temperature of post-process air in the moisture laden area by manually adjusting bypass damper 8 using the actuating handle (not shown) to control the amount of pre-reactivation air diverted around post-process pre-reactivation heat exchanger 7. In an alternative embodiment, the temperature of post-process air in the moisture laden area may be adjusted by manually actuating bypass damper 8A using an actuating handle (not shown) to control the amount of post-process air diverted around post-process pre-reactivation heat exchanger 7.

In another embodiment, as shown in FIGS. 1A and 1B, the control system comprises a temperature sensor (thermostat) and a damper actuator (proportional controller) which monitors and controls all dehumidification functions, including desiccant rotor, and start and stop functions. In this embodiment, the proportional controller helps control the temperature of the post-process air by automatically actuating bypass damper 8 to control the amount of pre-reactivation air diverted around post-process pre-reactivation heat exchanger 7. In an alternative embodiment, the proportional controller helps control the temperature of the post-process air by actuating bypass damper 8A to control the amount of post-process air diverted around post-process pre-reactivation heat exchanger 7. The thermostat, which is located near air blower 56, measures the temperature of post-process air exiting the system. Optionally, a remote thermostat sensor 60 can be used to measure temperature levels at different locations within an affected area.

In operation with a proportional controller, when the thermostat detected high temperature levels in the affected area (e.g., temperature levels exceeding 100° F., or other temperature levels chosen by the operator), the damper actuator was manually adjusted to increase the amount of pre-reactivation air (or post-process air when using damper 8A) flowing through post-process pre-reactivation heat exchanger 7, and to decrease the amount of pre-reactivation air (or post-process air when using damper 8A) bypassing post-process pre-reactivation heat exchanger 7. This cooled the post-process air supplied to the affected area, and heated the pre-reactivation air in line 36 before it entered reactivation heater 10. Portable cooling units such as a package air-conditioner (Goodman Manufacturing Co., Houston, Tex.) may be used to provide additional cooling in areas in which the outside temperature is hot (e.g., over 90° F.) or in buildings with cooling systems incapable of maintaining adequate temperature and humidity levels. When the thermostat detected temperature levels lower than about 75° F. (or other temperature levels chosen by the operator), the damper actuator was manually adjusted to decrease the amount of pre-reactivation air (or post-process air when using damper 8A) flowing through post-process pre-reactivation heat exchanger 7, and to increase the amount of pre-reactivation air (post-process air when using damper 8A) bypassing post-process pre-reactivation heat exchanger 7 so that heat loss in the post-process airstream could be minimized. This warmer air increased the rate at which water vapor was removed from the affected area. In a preferred embodiment, an electronically-actuated proportional controller capable of receiving temperature readings from a thermostat may be used to adjust bypass damper 8 or 8A automatically as required.

In another embodiment, post-process air temperature can be increased by preheating the pre-process air where the outside temperature is low (e.g., below 50° F.) before the pre-process air enters the desiccant rotor using pre-process post-reactivation heat exchanger 54. Pre-process post-reactivation heat exchanger 54 removes heat from the post-reactivation air in line 52 and transfers it to the pre-process air in line 19. Alternatively, the post-process air temperature can be increased by transferring heat from the post-reactivated air to the post-process air before it enters the affected area using post-process post-reactivation heat exchanger 55. Post-process post-reactivation heat exchanger 55 removes heat from the post-reactivation air in line 53 and transfers it to the post-process air flowing in line 57. Optionally, if additional heating is required, an indirect-fired heater capable of adding a predetermined amount of heat to the post-process airstream such as a DAYTON® portable kerosene construction heater (W.W. Grainger, Chicago, Ill.) may be used.

EXAMPLE 2

Construction of Prototype

The main section of the prototype heat-modulating dehumidifier had a length of 86 in and a width of 34.5 in, and was fabricated using 0.125 in thick aluminum sheets. The system was divided into two sides, process and reactivation. The process side was equipped with a PPS 550×200 desiccant rotor assembly 6 (Rotor Source, Inc., Baton Rouge, La.) capable of removing moisture from pre-process air by heating the pre-reactivation air to a maximum temperature of 350° F. A metal-roughing, large particulate and rain filter (Smith Filter, Moline, Ill.) and a forty-percent two-inch pleated, fine particle filter (Smith Filter, Moline, Ill.) were used to provide clean air to the desiccant. Airflow through the desiccant rotor was maintained by a Baldor Super E TEFC, 1750 RPM air blower 56 (model # EL3510; Chicago Blower, Glendale Heights, Ill.) capable of a maximum flow rate of 1500 ft$^3$/min. The process side was also equipped with an IP 4/500/500 (space between plates, plate size, plate size, respectively, in millimeters) post process pre-reactivation heat exchanger 7 (Rotor Source, Baton Rouge, La.) to transfer heat from the post-process air flowing from process section 14 to the pre-reactivation air entering the system. The reactivation side was equipped with a reactivation air damper 8 (Faucheux Welding and Fabrication, Belle Chasse, La.) for controlling the temperature of air ejected into the affected area by directing pre-reactivation air either through the post pre-reactivation heat exchanger 7, around the pre-reactivation heat exchanger 7, or both.

A model HMI 41, handheld thermostat (Vaisala, Helsinki, Finland) was used to measure the temperature of post-process air exiting the system. The thermostat was placed near blower 56. A 8.75 in backward incline, 3450 RPM, 0.5 hp air blower 44 (model # L3503, Chicago Blower, Glendale Heights, Ill.) was used to supply pre-reactivation airflow through the air damper 8, reactivation heater 10, and desiccant rotor 12 at a maximum flow rate of 550 ft$^3$/min.

EXAMPLE 3

Testing of Constructed Prototype

To confirm that the prototype heat-modulating dehumidifier was highly effective, trials were conducted at Hygrolab, in Indianapolis, Ind., using the prototype described in Example 2. Once the prototype was set up and operating specifications (e.g., humidity and temperature levels) selected, start-up was initiated. Pre-process air having a temperature of 84° F. and a humidity level of 88 grains H$_2$O/lb air flowed through filtered inlet 1 and was divided into first and second streams before entering desiccant rotor assembly 6. The desiccant rotor decreased the moisture level to an average level of 38 grains H$_2$O/lb air. The first airstream flowed through an air-to-air, post-process pre-reactivation heat exchanger 7, where temperature was reduced to 85° F. before it was recombined with the second airstream. The combined airstream was then exhausted into the affected space at 98° F. When a Hygro-thermometer (i.e., a device which detects temperature and humidity) at Hygrolab detected temperature levels in excess of 100° F. in the affected area, the damper 8 was manually actuated to increase the level of heat transfer from the post-process airstream to the reactivation airstream, by admitting just enough pre-reactivation air through the post-process pre-reactivation heat exchanger 7, which decreased the temperature of process air entering the affected space. This demonstrated that the heat-modulating dehumidifier can cool air without the use of mechanical cooling devices. Conversely, when the Hygro-thermometer detected temperature levels below 80° F. in the affected area, the damper 8 was manually actuated to decrease the level of heat transfer from the post-process airstream to the reactivation airstream by restricting just enough pre-reactivation air flowing through the post-process pre-reactivation heat exchanger 7, which increased the temperature of process air entering the affected space. This demonstrated that the heat-modulating dehumidifier can add heat to the post-process air without the use of mechanical heating devices.

The desiccant rotor was regenerated with heat by drawing in pre-reactivation air from the ambient atmosphere, and flowing it through a 65,000 BTU gas burner (Dayton, Chicago, Ill.) at a flow rate of 550 SCFM before routing it through the reactivation section 12. The reactivation airstream exiting the desiccant rotor had a temperature of 110° F.

Several conclusions were reached. The heat-modulating dehumidifier was effective in drying moisture-laden structures. The bypass damper and manual control system were effective in regulating the amount of heat extracted from the post-process air before it exited the heat-modulating dehumidifier. The bypass damper and manual control system produced two beneficial outcomes. First, the control system monitored the temperature and humidity of the air within the affected area, and adjusted the temperature levels, while maintaining maximum drying efficiency of the exiting post-process air to maximize drying rate and energy consumption efficiency. Second, the bypass damper regulated the amount of heat transfer between the post-process and the pre-reactivation airstreams, which cooled and heated post-process air without the need for mechanical cooling or heating systems.

The complete disclosures of all references cited in this specification are hereby incorporated by reference. In the event of an otherwise irreconcilable conflict, however, the present specification shall control.

I claim:

1. A heat-modulating dehumidifier for dehumidifying and controlling the temperature of air to be delivered to a moisture-laden area, said heat-modulating dehumidifier without the use of mechanical cooling devices, comprising:
   (a) a desiccant rotor comprising at least two process chambers and a single reactivation chamber, through which chambers air can flow; wherein said process chambers are adapted to heat and dehumidify a process air stream to produce first and second post-process air streams; and wherein said process chambers are adapted to transfer heat to a second air stream and to transfer a selected fraction of the heat to said second air stream or said reactivation chamber; wherein the selected fraction is between 0 percent and 100 percent;
   (b) a first heat exchanger adapted to transfer heat from the first post-process air stream to the second air stream before the first and second post-process air streams are joined to form a combined post-process air stream; and to eject the combined post-process air stream into the moisture-laden area;
   (c) a first bypass damper capable of adjustably diverting at least a portion of the second air stream from said heat exchanger, and of delivering the remaining portion of the second air stream to said heat exchanger;
   (d) a heater for heating the second air stream, after the second air stream has passed either through or around said heat exchanger, to a temperature sufficient to remove moisture from said reactivation chamber; and
   (e) a control system comprising a temperature sensor and a damper actuator; wherein said damper actuator is adapted to adjust the temperature of the first post-process air by actuating said bypass damper to control the amount of the second air stream that is diverted from said heat exchanger;

wherein:
   (f) when said temperature sensor detects that the temperature in the moisture-laden area is greater than a pre-selected level, said damper actuator adjusts the position of said bypass damper to decrease the amount of the second air stream diverted from said heat exchanger, thereby increasing heat transfer from the first post-process air stream to the second air stream and decreasing the temperature of the first post-process air stream; and when said temperature sensor detects that the temperature in the moisture-laden area is less than a pre-selected temperature, said damper actuator adjusts the position of said damper to increase the amount of the second air stream being diverted from said heat exchanger, thereby decreasing heat transfer from the first post-process air stream to the second air stream and increasing the temperature of the first post-process air stream.

2. A device as recited in claim 1, wherein said device is adapted to draw the process air stream from inside the moisture-laden area.

3. A device as recited in claim 1, wherein said device is adapted to draw the process air stream from outside the moisture-laden area.

4. A device as recited in claim 1, wherein said device is adapted to draw the second air stream from outside the moisture-laden area.

5. A device as recited in claim 1, wherein said device is adapted to draw the second air stream from inside the moisture-laden area having a higher humidity than the combined post-process air stream after it has been ejected into the moisture-laden area.

6. A device as recited in claim 1, wherein said heat-modulating dehumidifier further comprises a second heat exchanger adapted to receive and transfer heat from the second air stream to the process air stream after the second air stream has passed through said reactivation chamber.

7. A device as recited in claim 1, wherein said heat-modulating dehumidifier further comprises a second heat exchanger adapted to receive and transfer heat from the second air stream to the combined post-process air stream after the second air stream has passed through said reactivation chamber.

8. A device as recited in claim 1, wherein said desiccant rotor comprises three process chambers.

9. A device as recited in claim 1, wherein said heat-modulating dehumidifier further comprises a second bypass damper capable of adjustably diverting at least a portion of the first post-process air around said heat exchanger, and allowing any remaining portion of the first post-process air stream to flow through said heat exchanger.

10. A device as recited in claim 9, wherein said second bypass damper is actuated by said damper actuator to adjust the temperature of the first post-process air by controlling the amount of first post-process air available for heat transfer through said heat exchanger to the second air stream.

11. A device as recited in claim 1, wherein said temperature sensor comprises a thermostat.

12. A device as recited in claim 1, wherein said temperature sensor comprises a thermometer.

13. A device as recited in claim 1, wherein said damper actuator comprises an electronically-actuated proportional controller.

14. A device as recited in claim 1, wherein said damper actuator comprises an actuating handle.

15. A method for drying a moisture-laden area, comprising the steps of:
   (a) introducing a process air stream and a second air stream into a heat-modulating dehumidifier comprising a desiccant rotor comprising at least two process chambers and a single reactivation chamber, through which chambers air can flow; a first heat exchanger; a heater; a bypass damper; and a control system comprising a temperature sensor and a damper actuator; wherein the process air stream is drawn into the desiccant rotor through the process chambers; and a selected fraction of the second air stream is drawn into the first heat exchanger, while the remaining portion of the second air stream is diverted around the first heat exchanger to the heater; wherein the selected fraction is between 0 percent and 100 percent;
   (b) heating and dehumidifying the process air stream by flowing the process air stream through the process chambers and carrying over heat from the reactivation chamber to the process air stream; and wherein the heat produced by the reaction chambers allows for dehumidification of the process air stream by absorbing water vapor from the reactivation chamber;

(c) separating the process air stream into a first and second post-process air stream;

(d) transferring heat from the first post-process air stream to the second air stream;

(e) monitoring the temperature level in the moisture-laden area;

(f) adjusting the temperature in the moisture-laden area by adjusting the heat transfer from the first post-process air stream to the second air stream; wherein if the temperature sensor detects a temperature in the moisture-laden area greater than a pre-selected level, then the damper actuator adjusts the position of the first bypass damper to decrease the amount of the second air stream being diverted from the first heat exchanger, thereby increasing heat transfer from the first post-process air stream to the second air stream and decreasing the temperature of the first post-process air stream; and if the temperature sensor detects a temperature in the moisture-laden area less than a pre-selected level, then the damper actuator adjusts the position of the first damper to increase the amount of the second air stream being diverted from the first heat exchanger, thereby decreasing heat transfer from the first post-process air stream to the second air stream and increasing the temperature level of the first post-process air stream;

(g) combining the first and second post-process air streams; and (h) ejecting the combined first and second post-process air streams into the moisture laden area.

16. A method as recited in claim 15, wherein the device is adapted to draw the process air stream from inside the moisture-laden area.

17. A method as recited in claim 15, wherein the device is adapted to draw the process air stream from outside the moisture-laden area.

18. A method as recited in claim 15, wherein the device is adapted to draw the second air stream from outside the moisture-laden area.

19. A method as recited in claim 15, wherein the device is adapted to draw the second air stream from inside the moisture-laden area having a higher humidity than the combined post-process air stream after it has been ejected into the moisture-laden area.

20. A method as recited in claim 15, wherein the heat-modulating dehumidifier further comprises a second heat exchanger adapted to receive and transfer heat from the second air stream to the process air stream after the second air stream has passed through the reactivation chamber.

21. A method as recited in claim 15, wherein the heat-modulating dehumidifier further comprises a second heat exchanger adapted to receive and transfer heat from the second air stream to the combined post-process air stream after the second air stream has passed through the reactivation chamber.

22. A method as recited in claim 15, wherein the desiccant rotor comprises three process chambers.

23. A method as recited in claim 15, wherein the heat-modulating dehumidifier further comprises a second bypass damper capable of adjustably diverting a selected fraction of the first post-process air around the heat exchanger, and allowing any remaining portion of the first post-process air stream to flow through the heat exchanger; wherein the selected fraction is between 0 percent and 100 percent.

24. A method as recited in claim 23, wherein the second bypass damper is actuated by the damper actuator to adjust the temperature of the first post-process air by controlling the amount of first post-process air available for heat transfer through the heat exchanger to the second air stream.

25. A method as recited in claim 15, wherein the temperature sensor comprises a thermostat.

26. A method as recited in claim 15, wherein the temperature sensor comprises a thermometer.

27. A method as recited in claim 15, wherein the damper actuator comprises an electronically-actuated proportional controller.

28. A method as recited in claim 15, wherein the damper actuator comprises an actuating handle.

* * * * *